United States Patent
Ebert et al.

(10) Patent No.: US 6,808,690 B2
(45) Date of Patent: Oct. 26, 2004

(54) CATALYST ELEMENT FOR A STACKED REACTOR AND PROCESS FOR PRODUCING THE CATALYST ELEMENT

(75) Inventors: Andreas Ebert, Kirchheim (DE); Oskar Lamla, Kirchheim-Nabern (DE); Thomas Stefanovski, Böblingen (DE)

(73) Assignee: Ballard Power Systems AG, Kirchheim/Teck-Nabern (DE)

( * ) Notice: Subject to any disclaimer, the term of this patent is extended or adjusted under 35 U.S.C. 154(b) by 498 days.

(21) Appl. No.: 09/924,106

(22) Filed: Aug. 8, 2001

(65) Prior Publication Data

US 2002/0028746 A1 Mar. 7, 2002

(30) Foreign Application Priority Data

Aug. 8, 2000 (DE) .......................................... 100 38 525

(51) Int. Cl.[7] .................................................. B01J 35/02
(52) U.S. Cl. ...................................... 422/222; 422/180
(58) Field of Search ................................. 422/171, 177, 422/179, 180, 211, 222; 502/101; 423/650

(56) References Cited

U.S. PATENT DOCUMENTS

| | | | | |
|---|---|---|---|---|
| 3,499,265 A | * | 3/1970 | Lindenthal et al. ............... | 96/7 |
| 4,585,539 A | * | 4/1986 | Edson ...................... | 204/229.4 |
| 4,742,036 A | * | 5/1988 | Flockenhaus et al. ....... | 502/213 |
| 4,758,410 A | * | 7/1988 | Grimm et al. ............... | 422/311 |
| 5,270,127 A | * | 12/1993 | Koga et al. .................... | 429/17 |
| 5,516,492 A | * | 5/1996 | Dong et al. .................. | 422/186 |
| 6,197,267 B1 | * | 3/2001 | Naeem ........................ | 422/174 |
| 6,287,524 B1 | * | 9/2001 | Hums et al. ................. | 422/180 |
| 6,576,199 B1 | * | 6/2003 | Liu et al. ..................... | 422/177 |

FOREIGN PATENT DOCUMENTS

| | | |
|---|---|---|
| DE | 197 43 673 | 10/1997 |
| DE | 198 47 987 | 10/1998 |
| DE | 198 32 625 | 1/2000 |
| EP | 0974392 | 11/2000 |
| WO | WO 00/31816 | 6/2000 |

OTHER PUBLICATIONS

European Search Report and translation thereof.
U.S. patent application Ser. No. 09/421,352, Bachinger et al., filed Oct. 18, 1999.

* cited by examiner

Primary Examiner—Kiley Stoner
Assistant Examiner—Kevin McHenry
(74) Attorney, Agent, or Firm—Crowell & Moring LLP

(57) ABSTRACT

A catalyst element for a stacked reactor for generating hydrogen from hydrocarbons includes a catalyst disc of porous material and a solid connection element. The catalyst-side end of the connection element is at least partially enclosed by the catalyst disc and is connected to this disc. The catalyst-side end of the connection element may have a mediator layer that is joined to the connection element over the entire area by sintering, soldering, or adhesive bonding. The mediator layer is joined to the catalyst disc over the entire area by sintering. Attachment means are provided at the exposed end, which is remote from the catalyst, of the connection element.

8 Claims, 2 Drawing Sheets

CATALYST ELEMENT FOR A STACKED REACTOR AND PROCESS FOR PRODUCING THE CATALYST ELEMENT

BACKGROUND AND SUMMARY OF INVENTION

This application claims the priority of German application No. 100 38 525.7, filed Aug. 8, 2000, the disclosure of which is expressly incorporated by reference herein.

The present invention relates to a catalyst element for a stacked reactor for generating hydrogen from hydrocarbons having a catalyst disc of porous material. This catalyst element is suitable for connecting a stacked reactor to the environment. The present invention also relates to a process for producing the catalyst element; to a stacked reactor which is constructed from a plurality of catalyst discs stacked on top of one another; and to a process for producing a stacked reactor.

German laid-open publication 197 43 673 A1, discloses a device for the generation of hydrogen which has at least one thin, large-area layer (catalyst disc) which is formed by compressing catalyst material and through which a reaction mixture can be forced. The reaction mixture loses pressure as it passes through the catalyst disc. The catalyst disc has a mesh-like support structure, which preferably consists of dendritic copper. This mesh-like support structure is created by admixing a metal powder comprising dendritic copper with a catalyst powder and compressing this mixture to form a shaped body, the catalyst disc in the green state. Then, the shaped body is sintered, and the catalyst disc is finished. A plurality of catalyst discs which have been stacked on top of one another and joined together form a stacked reactor.

German patent application 198 47 987.5 discloses a device for the generation of hydrogen comprising at least one thin, large-area catalyst layer (catalyst disc). The starting material for producing the catalyst disc is exclusively copper powder, i.e. no additional fraction of a catalytically active material is admixed with the copper powder. For its production, the copper powder, preferably dendritic copper, is pressed to form a shaped body in the form of a thin, highly compressed layer which will form the catalyst disc. The shaped body is then sintered in a reducing atmosphere, forming a "catalyst disc" without a catalyst layer. To form a thin, large-area catalyst layer, a surface layer of the shaped body is activated, as a catalyst layer, by repeatedly oxidizing and reducing the surface of the shaped body. A stacked reactor is constructed from a plurality of catalyst discs which have been stacked on top of one another and joined together.

German patent application 198 32 625.4 discloses a stacked reactor comprising catalyst discs stacked on top of one another and a process for producing a stacked reactor. In this case, catalyst discs in the green state, i.e. the pressed shaped bodies prior to the sintering process, are stacked on top of one another to form a stacked reactor and are then sintered jointly in the stacked state. The sintering may take place under the action of a predetermined pressure. The joint sintering results in a sealed connection between the individual catalyst discs.

Stacked reactors of this type are usually fitted in a housing and connected to connection lines, for example for starting material stream and product stream. The stacked reactors and the connections have to be securely sealed with respect to the outside. In the prior art, the sealing forces required are applied as compressive forces across the entire stacked reactor. For this purpose, it is necessary for the entire stacked reactor to be clamped in place by complex clamping devices. In operation, changes in spacing or expansion have to be absorbed by springs or similar compensation elements. Therefore, the clamping device has to be matched as accurately as possible to the dimensions of the stacked reactor, and it is difficult to install stacked reactors of different dimensions.

The present invention is based on the object of providing a catalyst element, in particular for the production of a stacked reactor of the type described in the introduction, which allows simple and inexpensive connection to the environment without connection forces which occur in the process acting on the catalyst element or on a stacked reactor of this type.

This object is achieved by a catalyst element according to the present invention. Furthermore, a stacked reactor for generating hydrogen from hydrocarbons may comprise at least one catalyst element according to the present invention as a catalyst connection disc.

The catalyst element according to the present invention for a stacked reactor for generating hydrogen from hydrocarbons, having a catalyst disc of porous material, includes a solid connection element. The catalyst-side end of the solid connection element is at least partially enclosed by the catalyst disc and is joined to the disc. Attachment means are provided at the exposed end of the connection element, which is remote from the catalyst. The solid connection element can be joined to the porous material of the catalyst disc by sintering, soldering, welding, adhesive bonding, screwing and/or clamping. Sintering is carried out under the application of pressure. In one embodiment, it is also possible for a mediator layer to be provided between the catalyst-side end of the connection element and the surface of the catalyst disc.

As noted, the catalyst-side end of the connection element may have a mediator layer. The mediator layer is joined to the connection element over the entire area by sintering, soldering or adhesive bonding. The mediator layer is joined to the catalyst disc over the entire area by sintering and attachment means are provided at the exposed end, which is remote from the catalyst, of the connection element. If the connection element used is produced from a different material from the mediator layer which follows, it is possible, in order to improve the adhesion between connection element and mediator layer, to provide a metal layer which is produced by electrodeposition. The layer thickness of this metal layer may usually be from approximately 50 $\mu$m to a few 100 $\mu$m. The mediator layer itself, which contains or consists of a metal or a metal alloy, has a layer thickness of approximately 0.5 to 3 mm, preferably of approximately 1 to 2 mm. By way of example, when using a connection element made from stainless steel and a mediator layer, preferably of dendritic copper, the metal layer produced by electrodeposition will also be copper.

The catalyst disc or a stacked reactor constructed therefrom is connected to the environment via the connection element and the attachment means. Connecting forces are therefore advantageously absorbed by the solid connection element and are not transmitted to the catalyst disc or the stacked reactor. It is not necessary to clamp the entire stacked reactor, and consequently it is possible to dispense with a complex clamping device.

Substantially only the forces from the weight of the catalyst disc/stacked reactor, and possibly acceleration forces depending on the selected mounting/attachment, act between the connection element and the catalyst disc. The fact that the solid connection element is at least partially embedded in the porous catalyst disc or that the connection element and catalyst disc are joined by a mediator layer means that the active connection forces (1) between catalyst disc and connection element and (2) between connection element and environment connection are separated from one another.

The following facts must be taken into account when joining the connection element and the catalyst disc:

The catalyst disc, preferably made from copper, containing catalyst material or a catalyst layer on the surface, is heat-sensitive. However, it can only be joined to the connection element, preferably of stainless steel, at elevated temperatures. To obtain a connection between catalyst disc and connection element, it is possible to achieve this by a clamping mechanism or via a mediator layer located between catalyst disc and connection element, in which case the different temperature compatibility of the components or materials has to be taken into account through two process steps. In a first step, the connection element is combined at high temperatures with the mediator layer, by soldering at approximately 800° C. to 1000° C.; by sintering at approximately 600° C. to 1000° C. under pressure; or by adhesive bonding using an adhesive which is suitable for the materials used. In a subsequent second step, the catalyst disc is attached to the mediator layer, advantageously at a lower temperature by sintering on under pressure at temperatures of approximately 400° C. to 600° C. The catalyst disc may also be constructed from different metals or metal alloys.

To join the connection element and catalyst disc or connection element and mediator layer, it is possible to use a soldering operation employing, for example, silver solder or material which contains silver solder.

In one configuration of the present invention, a projection, which extends substantially perpendicular to the expected principal direction of load on the connection between catalyst disc and connection element, is provided on the catalyst-side end of the connection element. Designing the catalyst-side end in this way assists with joining catalyst disc and connection element by providing a form fit in addition to the joining forces which are present according to the particular type of joining process selected.

In a preferred embodiment of the present invention, a surface region of the catalyst-side end of the connection element ends substantially flush with the outer surface of the catalyst disc, and a section of the catalyst-side end extends at least partially parallel to the outer surface of the catalyst disc. By way of example, it is possible to achieve such a design of the catalyst-side end by providing a step-like structure. When connecting/joining the catalyst disc, it is possible, by a corresponding mating surface which rests substantially flat against the catalyst top side and the surface region, to ensure that the connection between catalyst disc and connection element is additionally clamped and thereby reinforced. The mating surface may be produced, for example, by a plate or a suitably designed environment connection.

In a preferred configuration of the present invention, the connection element has at least one passage, via which reaction starting materials and/or reaction products of the catalyst or stacked reactor are supplied and/or discharged. By way of example, a catalyst or a stacked reactor can be connected to suitable supply connections from the environment via the passage in the connection element. The sealing forces required to provide a reliable seal of the connection are in this case absorbed by the connection element and do not act on the catalyst or stacked reactor.

It will be understood that the features which have been mentioned above and those which are yet to be explained below can be used not only in the combination given in each instance but also in other combinations or on their own without departing from the scope of the present invention.

Other objects, advantages and novel features of the present invention will become apparent from the following detailed description of the invention when considered in conjunction with the accompanying drawings.

DETAILED DESCRIPTION OF THE DRAWINGS

Figure 1:
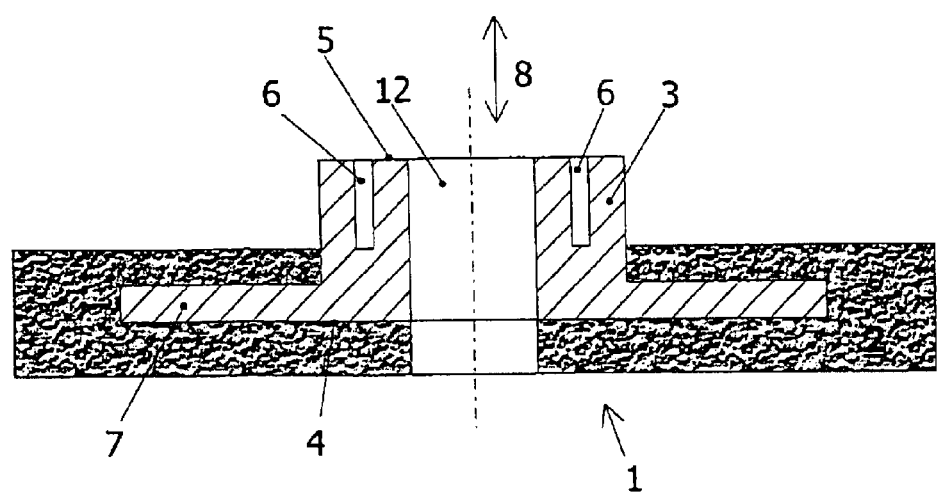
FIG. 1 shows a side view of a section through a first embodiment of a catalyst element according to the present invention.

FIG. 1 shows a side view of a section through a first embodiment of a catalyst element 1 according to the present invention. The catalyst disc 2 consists of porous material and preferably has a mesh-like support structure (not shown). For reasons of clarity, details of the catalyst disc 2, such as for example channels for starting materials/products, are not shown.

The support structure can be produced, for example, by admixing a metal powder, preferably dendritic copper powder, with a catalyst powder (i.e., material containing catalytically active substances) during the production of the catalyst disc 2, which, during compression, leads to a mesh-like support structure being formed. Another possible option consists in using exclusively copper powder, which at least partially comprises dendritic copper, for the catalyst disc 2. In general, the catalyst disc 2 is produced by pressing a shaped body, known as a green blank, from starting material in powder form and sintering the green blank.

A solid connection element 3 is integrated in the catalyst disc 2. The connection element 3 consists of a metal, such as for example copper, or a metal alloy, such as for example steel. The solid connection element 3 has a catalyst-side end 4 and an exposed end 5 which is remote from the catalyst.

The catalyst-side end 4 of the connection element 3 is at least partially enclosed by the porous material of the catalyst disc 2 and is joined to this material. This connection may be produced, for example, by sintering, soldering or welding, adhesive bonding, and/or clamping. A projection 7 is provided on the catalyst-side end 4 of the connection element 3. The projection extends substantially perpendicular to an expected principal direction of load 8 on the connection between catalyst disc 2 and connection element 3. These components are therefore also connected to one another in a positively locking manner.

Attachment means 6 are provided at the exposed end 5, which is remote from the catalyst, of the connection element 3. The attachment means 6 can be used to connect the connection element 3 and the catalyst disc 2 or a stacked reactor constructed therefrom to, for example, holding means, connections, or equipment of the surrounding environment. The forces produced by this connection act substantially on the connection element 3 and are not transmitted to the catalyst disc 2. These attachment means 6 are illustrated as screw connections in the drawings. However, it is also possible to use other suitable attachment means which are known to the person skilled in the art. The connection element 3 can be used for easy attachment of the catalyst disc 2 to holding means or for joining or connecting to supply lines or sources. For the latter purpose, the solid connection element 3 is equipped with at least one passage 12. Via the passage 12, by way of example, channels (not shown) in the catalyst disc 2 or the stacked reactor for product streams or starting material streams are connected to suitable connections in the environment for starting materials/products.

Figure 2:
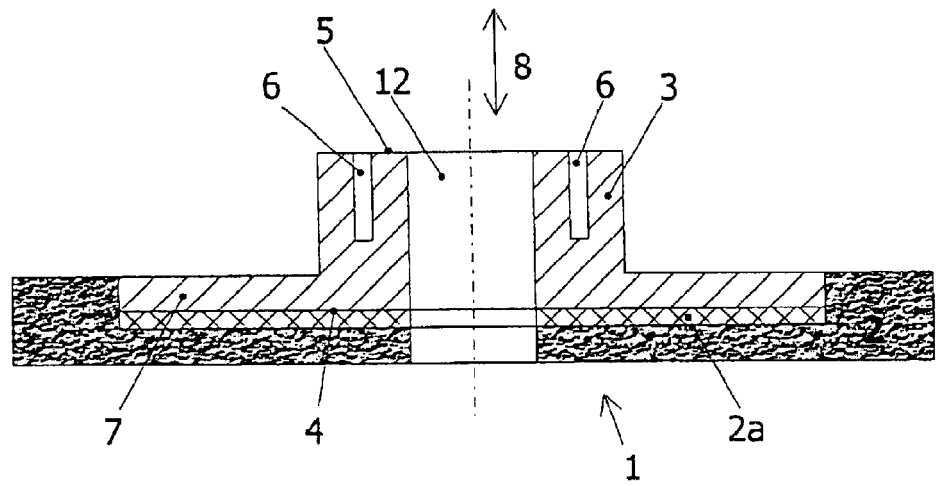
FIG. 2 shows a side view of a section through a second embodiment of a catalyst element according to the present invention.

FIG. 2 shows a side view of a section through a second embodiment of a catalyst element according to the present invention. The catalyst element 1 includes a solid connection element 3, the catalyst-side end 4 of which has a mediator layer (2a). The mediator layer 2a is joined to the connection element 3 over the entire area by sintering or soldering. The soldering or sintering under pressure takes place at temperatures of around 1000° C. Further joining to the catalyst disc 2, which has a matching recess with a lateral edge, takes place over the entire area by sintering under the application of pressure at approximately 450° C. via the mediator layer 2a. Attachment means 6 are provided at the exposed end 5, which is remote from the catalyst, of the connection element 3.

Figure 3:
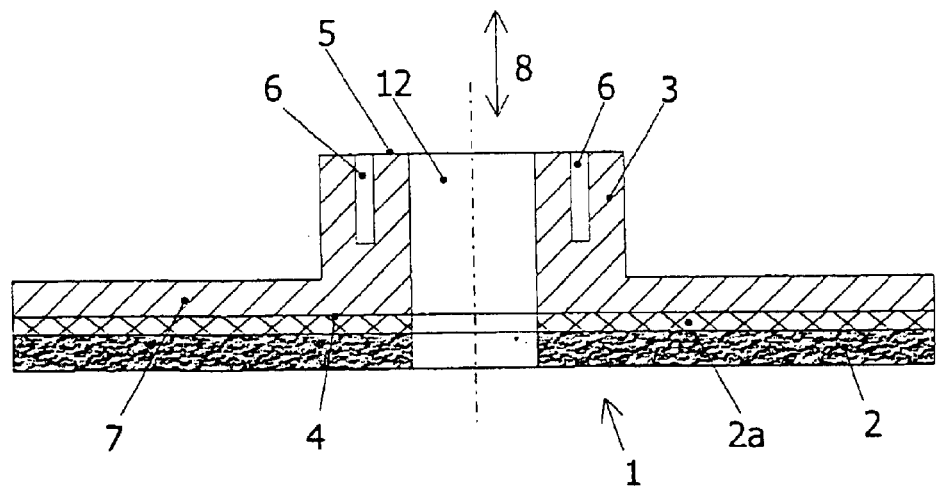
FIG. 3 shows a side view of a section through a third embodiment of a catalyst element according to the present invention.

FIG. 3 shows a side view of a section through a third embodiment of a catalyst element according to the present invention. The catalyst element 1 includes a solid connection element 3, the catalyst-side end 4 of which likewise has a mediator layer 2a which is joined to the connection element 3 over the entire area by sintering or soldering. The soldering or sintering under pressure takes place at temperatures of around 1000° C. The further attachment to the catalyst disc 2 is effected via the mediator layer 2a over the entire area by sintering under the application of pressure at approximately 450° C., the connection element ending flush with the overall circumference of the catalyst disc. Attachment means 6 are provided at the exposed end 5 of the connection element 3, which is remote from the catalyst.

Figure 4:
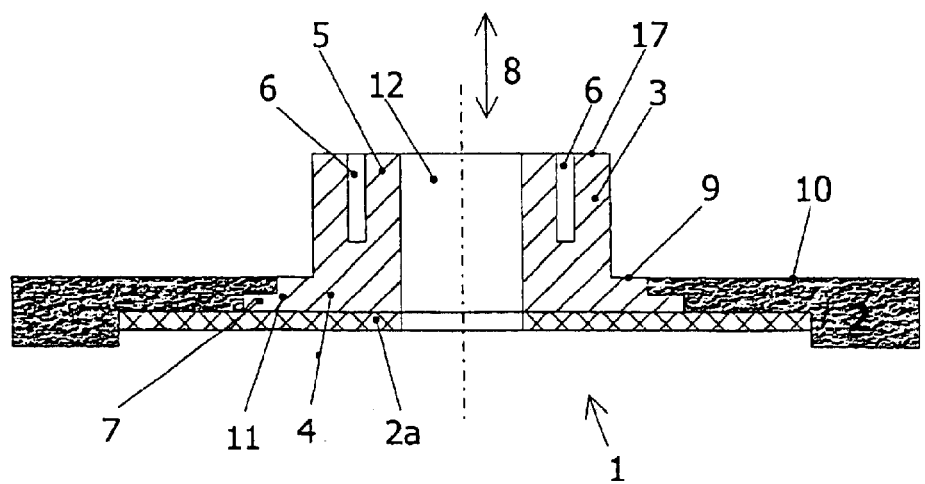
FIG. 4 shows a side view of a section through a fourth embodiment of a catalyst element according to the present invention.

FIG. 4 shows a side view of a section through a fourth embodiment of the catalyst element 1. In this case, the catalyst-side end 4 of the connection element 3 is designed in such a way that a surface region 9 ends substantially flush with the outer surface 10 of the catalyst disc 2. Moreover, a section 11 of the catalyst-side end 4 extends at least partially parallel to the outer surface 10 of the catalyst disc 2.

Figure 5:
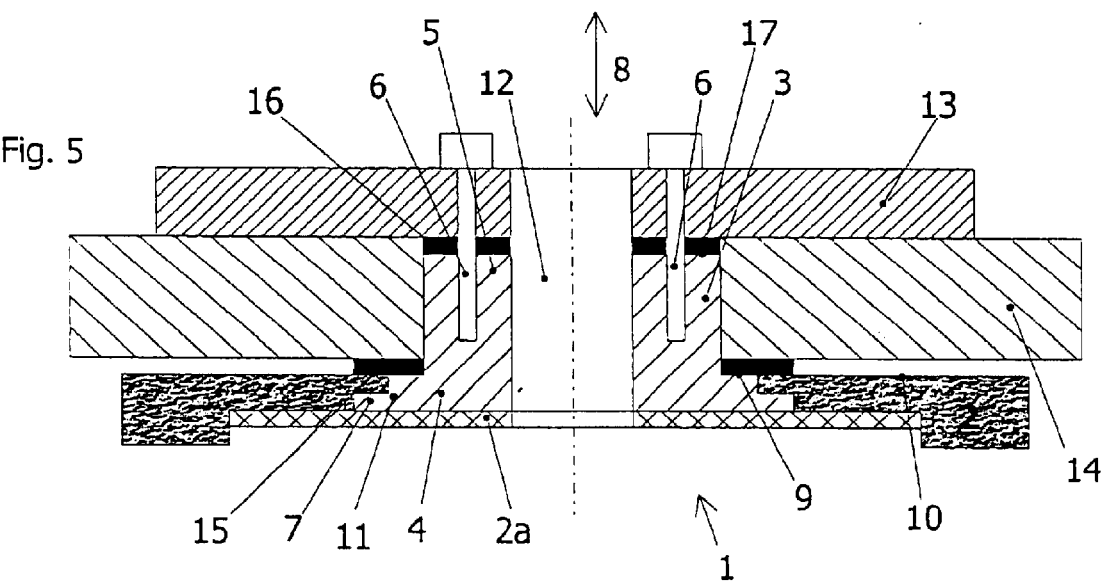
FIG. 5 shows a side view of a section through the fourth embodiment of the catalyst element according to the present invention in the connected state.

A design of this type can be achieved, for example, by a stepped structure of the outer side of the catalyst-side end 4. In the connected state, as shown in FIG. 5, the catalyst disc 2 and the connection element 3 can be clamped with respect to one another by a structure of this type, and as a result the strength of the connection between catalyst disc 2 and connection element 3 can be increased. As shown in FIG. 4, instead of forming the surface region 9 it is also possible for the connection surface 17 of the environment-side end 5 of the connection element 3 to end flush with the surface 10 of the catalyst disc 2. A configuration of this type is determined by the space which is available and required for the attachment means 6, i.e. by the thickness of the catalyst disc 2 and the type of attachment means 6.

FIG. 5 shows a side view of a section through the fourth embodiment of the catalyst element according to the present invention in the joined or connected state. The solid connection element 3 and the catalyst disc 2 are connected to an attachment section 13 of a supply connection via a screw connection 6. A seal 16 is provided between attachment section 13 and connection element 3 for sealing purposes. The connecting forces of the attachment means 6 are absorbed by the connection element 3 and attachment section 13 and are not transmitted to the catalyst disc 2.

A plate 14, which fits substantially flat between the attachment section 13 and the top side 10 of the catalyst disc 2, is provided between attachment section 13 and catalyst disc 2. The plate 14 can be used to clamp a region of the catalyst disc 2 between the section 1 of the connection element 3 and the plate 14, in order to strengthen the connection between catalyst disc 2 and connection element 3. In this case, the plate 14 is dimensioned in such a way that the attachment forces are substantially absorbed by the connection element 3, and only a proportion of the attachment forces contributes to the clamping of catalyst disc 2 and connection element 3. A further seal 15 in the region of the connection serves to uniformly distribute and regulate the pressure for clamping and to additionally seal the connection element with respect to the environment.

To produce the catalyst disc 2, a starting material in powder form is pressed to form a shaped body and sintered, as has already been described in connection with FIG. 1. The catalyst disc 2 can be produced using a process as described in the German laid-open publication 197 43 673 A1. According to this process, a mixture of catalyst material and metal powder is used as the starting material in powder form. However, the process described in the German patent application 198 47 987.5 can also be used to produce the catalyst disc 2. In this case, dendritic copper powder is preferably pressed to form a shaped body and sintered in a reducing atmosphere. Then, a thin, large-area catalyst layer is activated by oxidizing and reducing the surface of the shaped body.

In order to integrate the connection element 3 in the catalyst disc 2, this element can be pressed together with the starting material in powder form, to form the shaped body. The connection element 3 and catalyst disc 2 can be joined by sintering or adhesive bonding. In the case of adhesive bonding, the adhesive used is preferably a heat-activated adhesive. The sintering is preferably carried out using a process as described in the German patent application 198 32 625.4. According to this, the connection element 3 can be sintered to the catalyst disc 2 under the application of pressure. In this case, cavities in the catalyst disc may be supported by support devices. When constructing a stacked reactor from catalyst discs, the catalyst discs are preferably sintered jointly in the stacked state.

To integrate the connection element 3 in the catalyst disc 2, it is also possible firstly to press a shaped body with suitable recesses for the connection element 3, with sintering if required. The connection element 3 is inserted into the recesses in the shaped body and is joined to this body by soldering, welding, adhesive bonding, clamping and/or sintering. A mediator layer 2a, which assists the bonding between connection element 3 and catalyst disc 2, can be applied to the connection element 3.

For better adhesion of the material of the catalyst disc to the connection element 3, the connection element may be subjected to a surface treatment by sandblasting, etching and/or application of a mediator layer (2a) before being integrated in the shaped body or the catalyst disc 2.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A catalyst element for a stacked reactor for generating hydrogen from hydrocarbons, comprising:
    a catalyst disc of porous material;
    a solid connection element having a catalyst-side end that is at least partially enclosed by and joined to the catalyst disc; and
    attachment means at an exposed end of the connection element at a distance from the catalyst disc.

2. A catalyst element according to claim 1, further comprising a mediator layer between the catalyst-side end of the solid connection element and a surface of the catalyst disc.

3. A catalyst element according to claim 2, further comprising an electrodeposited metal layer between the solid connection element and the mediator layer.

4. A catalyst element according to claim 1, wherein the catalyst-side end of the solid connection element comprises a projection that extends substantially perpendicular to an expected principal direction of load on the connection between the catalyst disc and the solid connection element.

5. A catalyst element according to claim 1, wherein:
    a surface region of the catalyst-side end of the solid connection element ends substantially flush with an outer surface of the catalyst disc, and
    a section of the catalyst-side end extends at least partly parallel to the outer surface of the catalyst disc.

6. A catalyst element according to claim 1, wherein the solid connection element has at least one passage by which at least one of reaction starting materials or reaction products are supplied or discharged.

7. A catalyst element for a stacked reactor for generating hydrogen from hydrocarbons, comprising:
    a catalyst element of porous material;
    a solid connection element having a catalyst-side end;
    a mediator layer joined to the solid connection element over an entire area by sintering, soldering, or adhesive bonding, wherein the mediator layer is joined to the catalyst disc over an entire area by sintering; and
    attachment means at an exposed end of the solid connection element which is at a distance from the catalyst disc.

8. A catalyst element for a stacked reactor for generating hydrogen from hydrocarbons, comprising:
    a catalyst disc of porous material;
    a connection element having a catalyst-side end that is at least partially enclosed by and joined to the catalyst disc; and
    a screw connection at an exposed end of the connection element at a distance from the catalyst disc.

* * * * *